US009538558B2

(12) United States Patent
Kakani et al.

(10) Patent No.: US 9,538,558 B2
(45) Date of Patent: Jan. 3, 2017

(54) METHODS AND APPARATUSES FOR MANAGING ACKNOWLEDGEMENTS FOR MULTICAST DATA IN A WIRELESS NETWORK

(71) Applicant: Qualcomm Technologies International, Ltd., Cambridge (GB)

(72) Inventors: Naveen Kumar Kakani, Coppell, TX (US); Raja Banerjea, San Jose, CA (US)

(73) Assignee: Qualcomm Technologies International, Ltd., San Diego, CA (US)

(*) Notice: Subject to any disclaimer, the term of this patent is extended or adjusted under 35 U.S.C. 154(b) by 161 days.

(21) Appl. No.: 14/315,822

(22) Filed: Jun. 26, 2014

(65) Prior Publication Data
US 2015/0382381 A1 Dec. 31, 2015

(51) Int. Cl.
*H04W 76/00* (2009.01)
(52) U.S. Cl.
CPC .................. *H04W 76/002* (2013.01)
(58) Field of Classification Search
CPC ............ H04W 76/002; H04J 2203/0019; H04L 12/18; H04L 12/184; H04L 12/1845; H04L 12/185; H04L 2012/5642; H04L 2012/6416; H04L 29/06455
USPC ......................................................... 370/312
See application file for complete search history.

(56) References Cited

U.S. PATENT DOCUMENTS 8,401,018 B2* 3/2013 Meylan .................. H04L 47/14
370/395.4
8,730,960 B2* 5/2014 Hart .................... H04L 12/1868
370/312
2005/0002365 A1* 1/2005 Xu ........................ H04L 1/1607
370/338
2005/0135284 A1* 6/2005 Nanda ............... H04L 29/06068
370/294
2005/0135295 A1* 6/2005 Walton .................. H04W 74/00
370/328
2005/0135318 A1* 6/2005 Walton ................... H04L 12/66
370/338

(Continued)

FOREIGN PATENT DOCUMENTS

GB         2491834 A       12/2012
WO    WO-2009136724 A2    11/2009
WO    WO 2014074681 A1 *  5/2014   ............... H04L 1/00

OTHER PUBLICATIONS

IEEE 802.11aa Standard—Part 11: Wireless LAN Medium Access Control MAC and Physical Layer Specifications, IEEE Computer Society, May 29, 2012, 162 pages.

*Primary Examiner* — Chi H Pham
*Assistant Examiner* — Robert Lopata
(74) *Attorney, Agent, or Firm* — Paradice and Li LLP

(57) ABSTRACT

The present invention relates generally to managing acknowledgements for multicast data in a wireless network. According to certain aspects, embodiments of the invention allow for adopting appropriate acknowledgement mechanisms to address the particular need of different applications, for example in terms of throughput, latency and delay. According to certain other aspects, embodiments of the invention can, depending on link conditions, vary the frequency of the acknowledgements to sinks, vary the application packet size and/or remove sink devices from the multicast group and reach them instead via unicast transmission or via an access point.

20 Claims, 7 Drawing Sheets

(56) References Cited

U.S. PATENT DOCUMENTS

| | | | |
|---|---|---|---|
| 2005/0238016 A1* | 10/2005 | Nishibayashi | H04L 1/1614 370/389 |
| 2006/0107166 A1* | 5/2006 | Nanda | H04B 7/0417 714/748 |
| 2006/0215586 A1* | 9/2006 | Hiddink | H04L 47/10 370/282 |
| 2007/0036116 A1* | 2/2007 | Eiger | H04L 12/5693 370/338 |
| 2007/0115905 A1* | 5/2007 | Jokela | H04L 1/1607 370/338 |
| 2008/0186867 A1* | 8/2008 | Schoo | H04L 1/0028 370/252 |
| 2008/0219226 A1* | 9/2008 | Oishi | H04L 1/1614 370/338 |
| 2009/0279470 A1* | 11/2009 | Seok | H04L 1/1685 370/312 |
| 2010/0165907 A1* | 7/2010 | Chu | H04L 12/1868 370/312 |
| 2010/0254392 A1* | 10/2010 | Katar | H04L 12/417 370/400 |
| 2011/0096710 A1* | 4/2011 | Liu | H04L 1/1614 370/312 |
| 2011/0116435 A1* | 5/2011 | Liu | H04L 1/1664 370/312 |
| 2011/0222408 A1* | 9/2011 | Kasslin | H04L 41/083 370/241 |
| 2012/0084616 A1* | 4/2012 | Wentink | H04L 1/1614 714/748 |
| 2013/0100952 A1* | 4/2013 | Hart | H04L 12/1868 370/390 |
| 2014/0241230 A1* | 8/2014 | Coombs | H04L 12/1868 370/312 |
| 2015/0312953 A1* | 10/2015 | Wang | H04L 1/00 370/312 |

* cited by examiner

METHODS AND APPARATUSES FOR MANAGING ACKNOWLEDGEMENTS FOR MULTICAST DATA IN A WIRELESS NETWORK

FIELD OF THE INVENTION

The present invention relates to wireless communications, and more particularly to methods and apparatuses for managing acknowledgements for multicast data in a wireless network.

BACKGROUND OF THE INVENTION

As WiFi networks become increasingly ubiquitous, new applications for WiFi are continually being developed. For example, the original IEEE 802.11 standards did not include any support for multicast or groupcast transmissions in the wireless network (i.e. a basic service set, or BSS), which would be useful for applications such as audio and video distribution. Recently, however, the IEEE 802.11aa standard included definitions for multicast/groupcast transmissions, including a mechanism where a WiFi access point (AP) can provide reliability by allowing for retransmissions of multicast/groupcast (MG) data. The retransmissions can be in response to acknowledgements (i.e. BlockAck) or lack thereof from receiving devices. However, there is currently no mechanism for applications to support transfer of data with varying delay, throughput and latency requirements depending on user experience.

Moreover, the sink devices that are receiving the multicast content can be positioned at different locations and experience different link conditions. However, there is currently no mechanism to change the frequency at which acknowledgements for each of the sink devices is requested. Similarly, with changes in application packet size there is a variation in the performance in the packet transfer delay and also the medium efficiency. While a higher packet size improves the medium efficiency it also increases the transfer delay of the application content. However, there is currently no mechanism to change packet application size based on link conditions.

Accordingly a need remains for a solution to these and other problems.

SUMMARY OF THE INVENTION

The present invention relates generally to managing acknowledgements for multicast data in a wireless network. According to certain aspects, embodiments of the invention allow for adopting appropriate acknowledgement mechanisms to address the particular need of different applications, for example in terms of throughput, latency and delay. According to certain other aspects, embodiments of the invention can, depending on link conditions, vary the frequency of the acknowledgements to sinks, vary the application packet size and/or remove sink devices from the multicast group and reach them instead via unicast transmission or via an access point.

In accordance with these and other aspects, a method for reliably transmitting multicast/groupcast (MG) data in a wireless network according to embodiments of the invention includes identifying a plurality of different MG acknowledgement mechanisms, the MG acknowledgement mechanisms differing in one or both of a first number of data frames sent between requesting acknowledgement from all receivers and whether any data frames are sent between requesting acknowledgement from respective receivers; identifying a MG transmission application that is executed by one or more computer processors; and selecting one of the plurality of different MG acknowledgement mechanisms for the identified MG transmission application.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to certain aspects, embodiments of the invention provide different acknowledgement mechanisms for multicast data in a wireless network, and further the ability to select an appropriate one of these different mechanisms based on particular user requirements in the wireless network.

Figure 1:
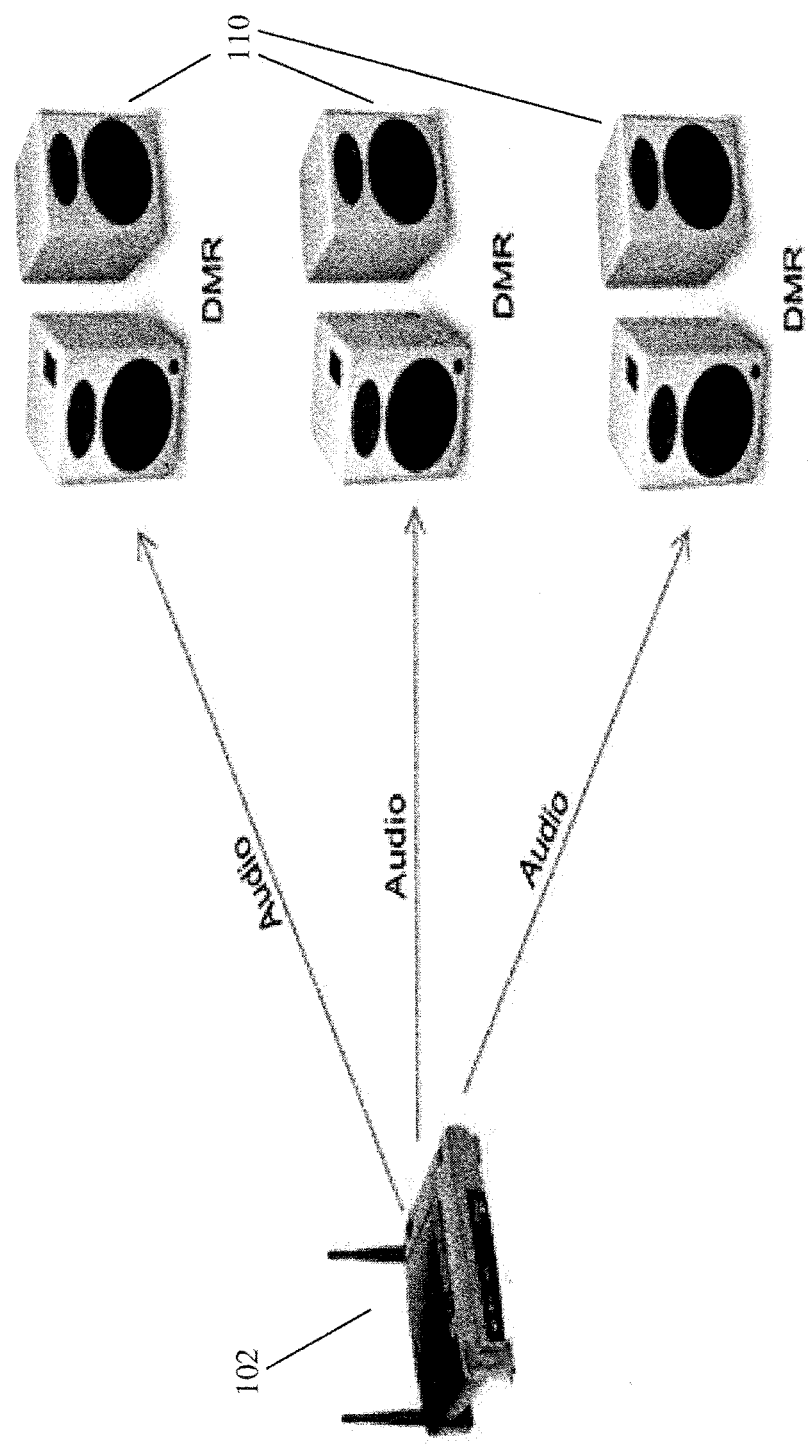
FIG. 1 is a diagram illustrating an example wireless network implementing a multicast scheme such as that defined by IEEE 802.11aa.

An example wireless network (i.e. BSS) 100 in accordance with IEEE 802.11aa is shown in FIG. 1. As shown, it includes an AP 102 and multicast/groupcast receivers/sinks 110. As mentioned above, IEEE 802.11aa defined a mechanism that allows an AP to set up an acknowledgement mechanism to reliably transport multicast/groupcast data (e.g. audio data) to the receivers/sink devices 110 (i.e. GCR group members).

Figure 2:
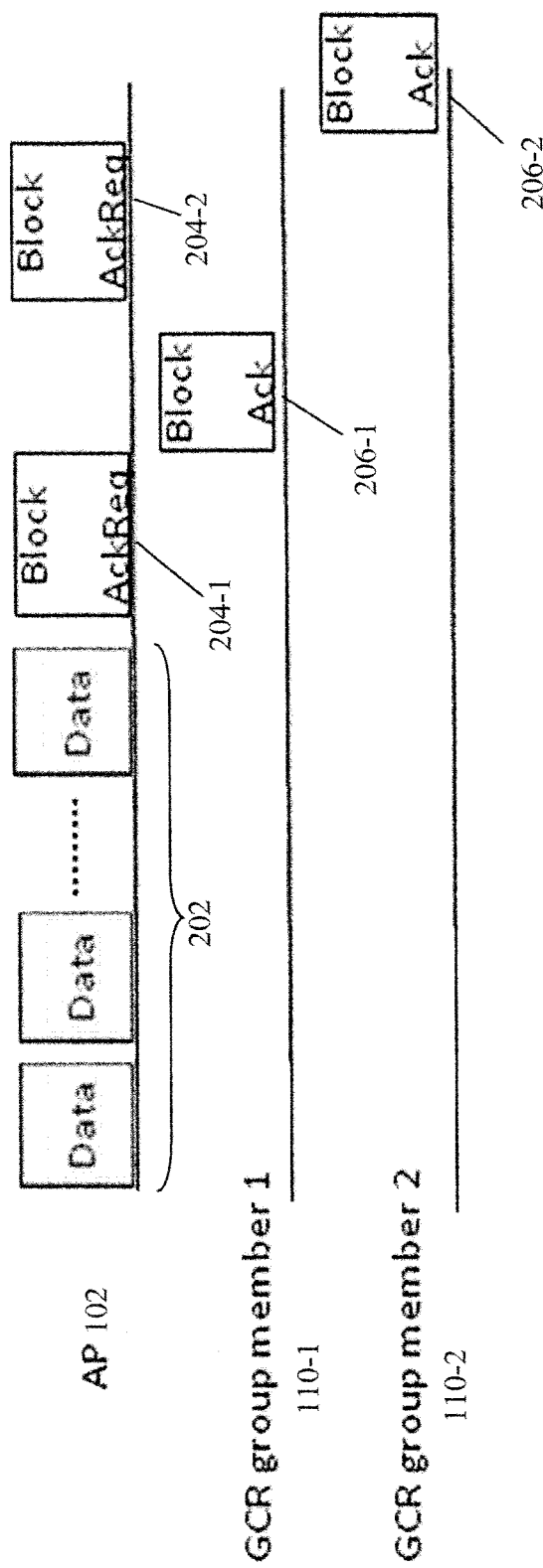
FIG. 2 is a diagram illustrating an example implementation of a reliable multicast scheme according to IEEE 802.11aa.

FIG. 2 shows an example of how the mechanism proposed in 802.11aa can be realized. As shown, after the AP 104 performs a multicast transmission of data 202 (e.g. an MPDU with MSDU, a MPDU with A-MSDU, or A-MPDU with each MPDU having an MSDU), it polls each GCR group member 110 sequentially by sending unicast BlockAckReq frames 204 to each member. In response, each of members 110 sends unicast BlockAcq frames 206 back to AP 104. Based on responses to its BlockAckReq frames 204, AP 104 can determine whether retransmission of multicast data is needed.

Figure 3:
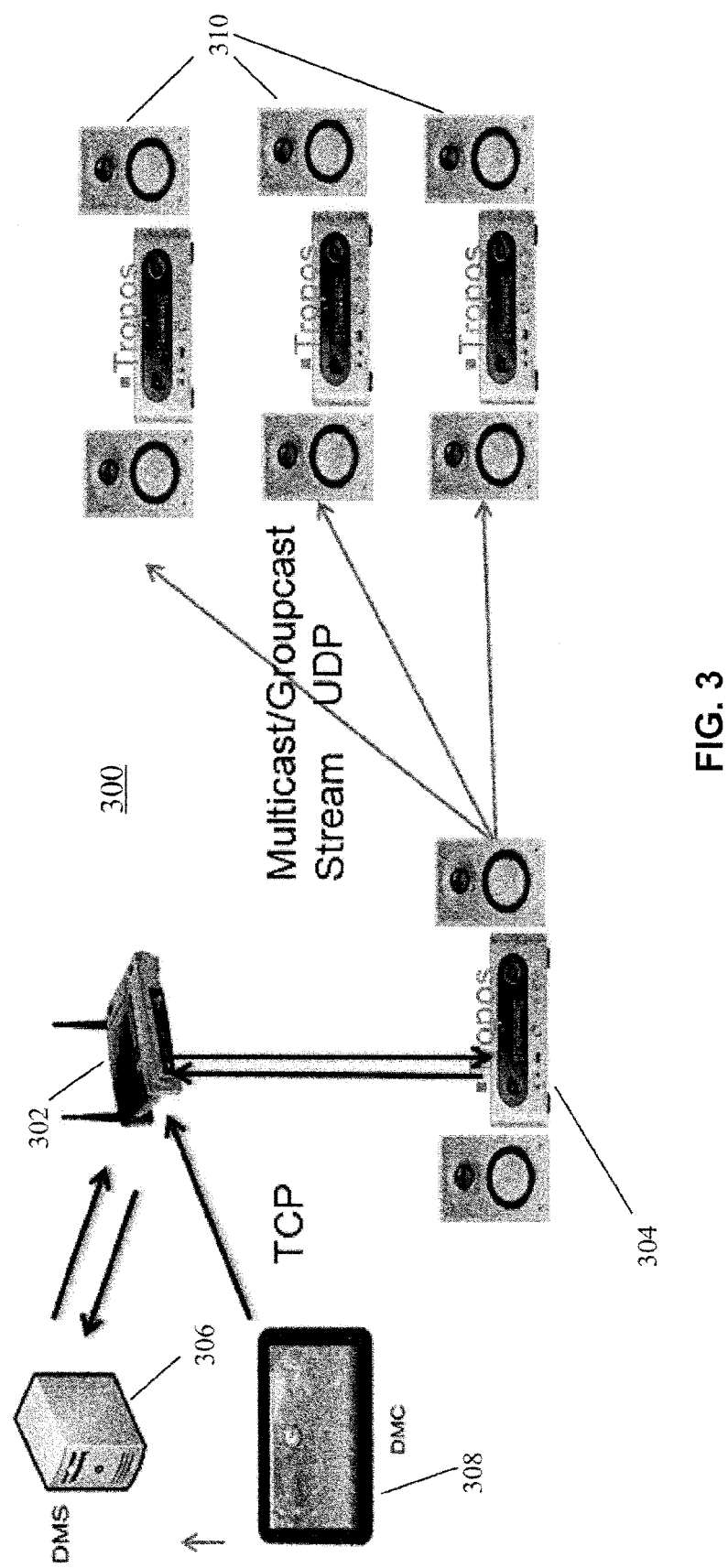
FIG. 3 is a diagram illustrating an example wireless network implementing a multicast scheme according to embodiments of the invention.

FIG. 3 is a diagram illustrating an example BSS 300 for transporting multicast/groupcast data according to embodiments of the invention. In this example, to implement a IEEE 802.11aa solution, a non-AP source device 304 is the device that is transmitting the multicast data to sink devices 310, rather than AP 302. However, the invention is not limited to this example, and the source device 304 can be an AP.

Various aspects of how a BSS 300 can be implemented are described in co-pending application Ser. No. 14/316,222, the contents of which are incorporated by reference herein in their entirety.

Generally, however, FIG. 3 shows an example BSS having a WiFi audio system implemented by source device 304 and sink devices 310, as well as DMS 306 and DMC 308. DMS 306 is a source of content (e.g. MPEG video, MP3 audio, etc.) that can be rendered by source device 304 and/or sink devices 310. It can be implemented as a WiFi-enabled network storage device, a storage device in a computer having WiFi communication support, a storage device in a mobile device such as an iPad, iPod, iPhone, etc. DMC 308 is a control device having a user interface with which a user typically interacts to control the selection and playback of content. DMC 308 can be implemented by a remote control tablet device, a mobile device such as an iPad, iPod, iPhone and associated application and operating system software, or a computer and associated application and operating system software (e.g. Windows or Apple OS).

Source device 304 is an audio/video device capable of rendering content (e.g. MPEG video, MP3 audio, etc.) and also having capabilities of acting as a multicast master. As such, source device 304 has built-in WiFi functionality (e.g. a WiFi chipset and associated firmware/software) that preferably supports IEEE 802.11aa, as well as the additional functionalities of the present invention as will be described below. Those skilled in the art will be able to understand how to implement the present invention by adapting the IEEE 802.11 functionality of such chipsets and associated firmware/software after being taught by the present examples.

Sink devices 310 are audio/video devices capable of rendering content (e.g. a WiFi speaker that can playback audio from MPEG video, MP3 audio, etc.) and also having capabilities of acting as a multicast slave. As such, sink devices 310 have built-in WiFi functionality (e.g. WiFi chipsets and associated firmware/software) that preferably support IEEE 802.11aa, as well as the additional functionalities of the present invention as will be described below. Those skilled in the art will be able to understand how to implement the present invention by adapting IEEE 802.11 functionality of such chipsets and associated firmware/software after being taught by the present examples.

AP 302 can be implemented by, for example, a wireless access point or router that supports IEEE 802.11aa. However, the invention is not limited to this example and can include any type of wireless station including access points and routers, as well as devices that do not support IEEE 802.11aa.

In a typical operation of the WiFi audio system included in BSS 300, a user selects content for playback using DMC 308, which sends control commands to DMS 306 via AP 302 using TCP/IP over WiFi. In response, DMS 306 sends the selected content to source device 304 via AP 302. Source device 304 then transmits the data via multicast to sink devices 310 using UDP/IP over WiFi as defined by IEEE 802.11aa, as possibly modified by embodiments of the invention. The selected content is then rendered by sink devices 310.

According to certain aspects, the present inventors recognize that different acknowledgement mechanisms for use with IEEE 802.11aa have their own pros and cons with respect to factors such as delay, throughput and latency. Embodiments of the invention, therefore, provide different acknowledgement mechanisms for use with IEEE 802.11aa, as well as methods for determining the appropriate mechanism to use in a given situation. The embodiments described below will be discussed in connection with an example BSS such as that described above in connection with FIG. 3, where the parameter Tan is the time between the arrival of packets from the application to MAC for transmission on the air. Additionally, Tarr can be the period of transmission of multicast data independent of the application data rate. For example, in a WiFi Direct network or BSS mode of operation, Tarr can be a beacon period or DTIM period. However, the invention is not limited to a BSS such as that shown in FIG. 3, and those skilled in the art will understand how to implement the invention in other systems, including systems similar to that shown in FIG. 1.

Figure 4:
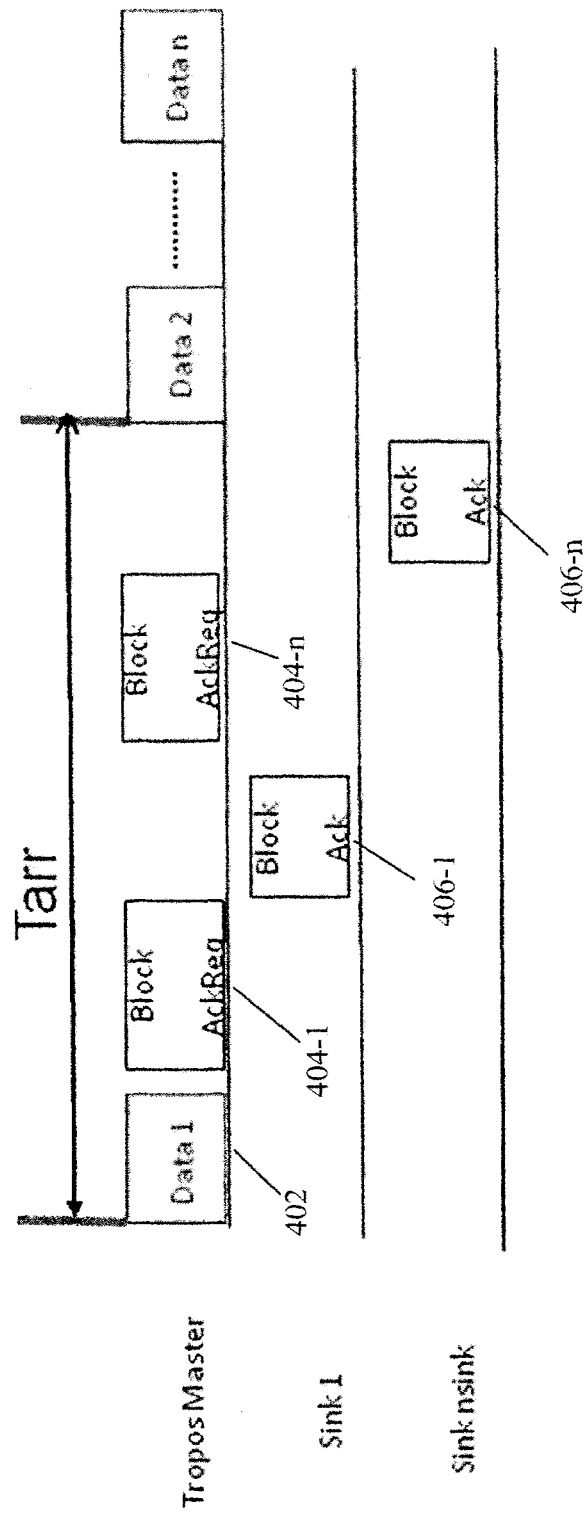
FIG. 4 is a diagram illustrating a first example acknowledgement mechanism for a reliable multicast scheme according to embodiments of the invention.

A first example acknowledgement mechanism (i.e. "Mechanism 1") according to embodiments of the invention is illustrated in FIG. 4.

As shown in the example of FIG. 4, the source device solicits a Block ACK 402 sequentially from each of the sinks after transmission of multicast data 404. If there are packet losses, the lost packet is re-transmitted at the next transmission (i.e. after Tarr time shown in FIG. 4) time along with any new data.

Figure 5:
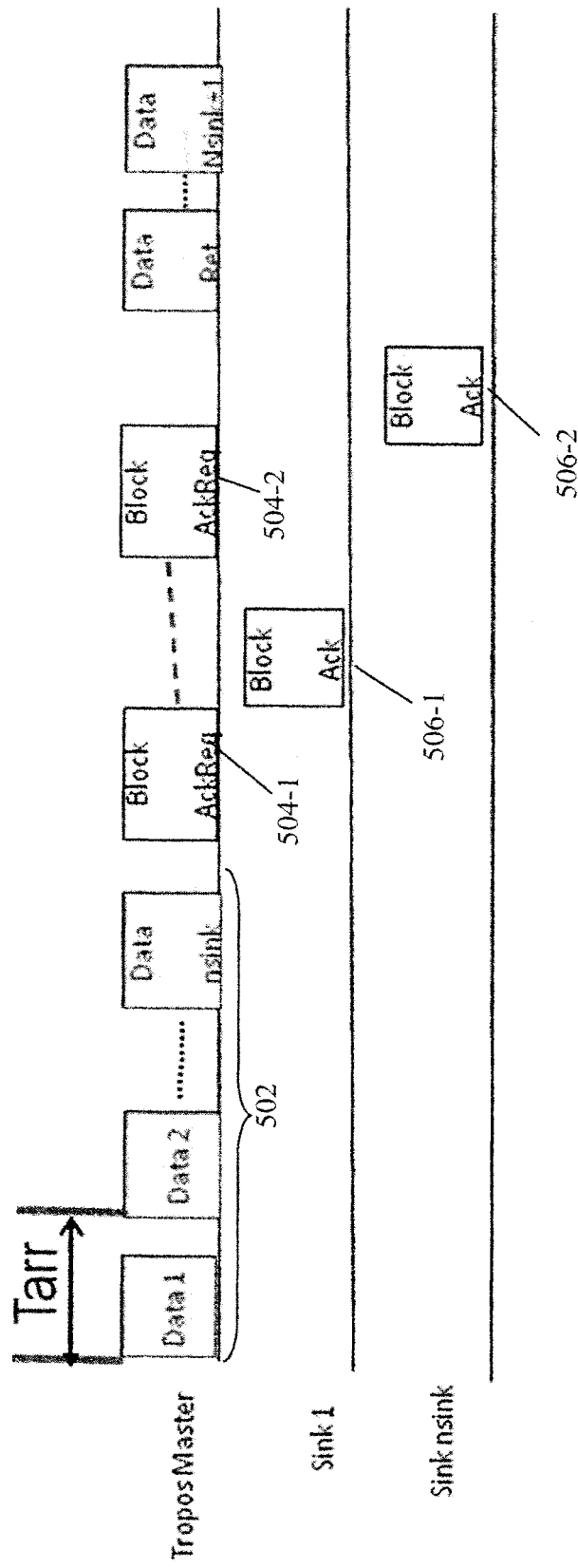
FIG. 5 is a diagram illustrating a second example acknowledgement mechanism for a reliable multicast scheme according to embodiments of the invention.

A second example acknowledgement mechanism (i.e. "Mechanism 2") according to embodiments of the invention is illustrated in FIG. 5.

As shown in the example of FIG. 5, the source device solicits a Block ACK 502 sequentially from each of the sinks after transmission of N_sink multicast data frames 504. If there are packet losses, the lost packet is re-transmitted at the next transmission time (i.e. after Tarr time shown in FIG. 5).

Figure 6:
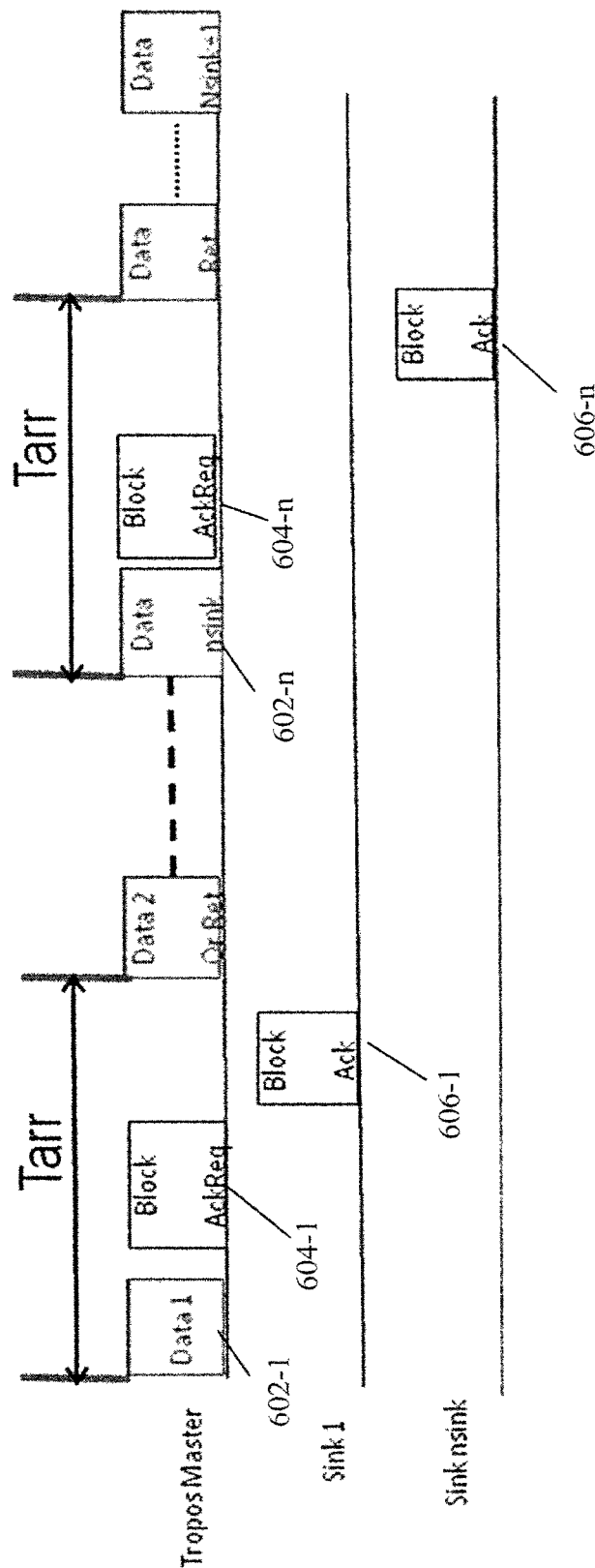
FIG. 6 is a diagram illustrating a third example acknowledgement mechanism for a reliable multicast scheme according to embodiments of the invention.

A third example acknowledgement mechanism (i.e. "Mechanism 3") according to embodiments of the invention is illustrated in FIG. 6.

As shown in the example of FIG. 6, the source device solicits a Block ACK from a single sink after each multicast data frame 604 transmission. If there are packet losses, the lost packet is transmitted at the next transmission time (i.e. after Tarr time shown in FIG. 6). The sink that is requested to send a Block ACK can be the same or different after every Tarr period. FIG. 6 shows an example where the sinks are selected such that all the sinks have an opportunity to send a Block ACK at least once every nsink*Tarr period.

Although not illustrated, another example mechanism according to embodiments of the invention can be considered an implicit ACK mechanism, in which the order and the timing after which the sinks have to send an acknowledgement is already pre-determined at the time of the setup of the reliable multicast/groupcast service. The steps are as follows.

First, during the GCR set up phase, the source device signals to each sink device in the group its own unique STA sequence number (Seq_sink). Then, after multicast transmissions, the sink device will send its ACK frame after Seq_sink*(SIFS+ACK Time), where "ACK Time" is the time it takes to send an ACK frame on the air, and SIFS is a buffer time between ACKs. In WLAN systems the spacing between two consecutive frames is SIFS period and typically this is set to 16 us. In typical systems, it is not likely that new sinks are added or deleted in between the data exchange. But if they are, the source can send an "Un Solicited GCR Response Frame" to update the sequence number of sink devices that are affected because of the change in the number of sinks Typically there should not be any change if a new sink is added (e.g. it can be added at the end).

An issue with this mechanism is that if a sink device doesn't receive a packet (i.e., there is no ACK on the air), the medium is free and can be captured by a non-source or sink devices in the BSS. To avoid this situation, the sink devices that are yet to send their acknowledgement can send their ACK earlier if they sense that the medium to be idle longer than SIFS (spacing between two ACK frames)+delta period (buffer period, can be around 4 us), and the priority of such an access to the medium is based on their sequence number and limit the medium being captured by non-source devices.

The following summarizes the pros and cons of the above-described Mechanisms 1, 2 and 3 for two different performance metrics.

A first performance metric is the amount of delay before a first retransmission and acknowledgement for the transmitted and retransmitted data. For Mechanism 1, this delay is minimum (i.e. Block ACKs are received from all the sinks after each data frame transmission). For Mechanism 2, the acknowledgement for transmitted data is received after the transmission of a maximum of "nsink" data frames. The acknowledgement for retransmission is also after transmission of "nsink" new frames. For Mechanism 3, in the best case, the delay before a decision to retransmit the data is made is similar to Mechanism 1 (i.e. the first sink indicates error in the received data). In the worst case the delay is similar to Mechanism 2 (i.e. the last sink is the one that is having the problem), which is after the transmission of "nsink' data frames. In summary, for Mechanism 1, data is retransmitted immediately. For Mechanism 2, data is retransmitted after a delay of transmission of 'nsink" number of frames. For Mechanism 3, statistically, the medium is used to retransmit a data frame after the transmission of "(nsink+1)/2" number of data frames.

A second performance metric is the impact of overheads on medium usage (i.e. efficiency). Mechanism 1 has the maximum overhead as there is a Block ACK request after each frame and for each sink For Mechanism 2, the overheads when compared to Mechanism 1 are reduced by a factor of "nsinks" as the Block ACK request is transmitted after transmitting "nsink" number of data frames. For Mechanism 3, the overheads are comparable to Mechanism 2.

Given the above pros and cons of Mechanisms 1, 2 and 3, the appropriate Mechanism can be used based on the application that is intended to be supported. An example methodology for implementing such support according to embodiments of the invention is shown in FIG. 7.

Figure 7:
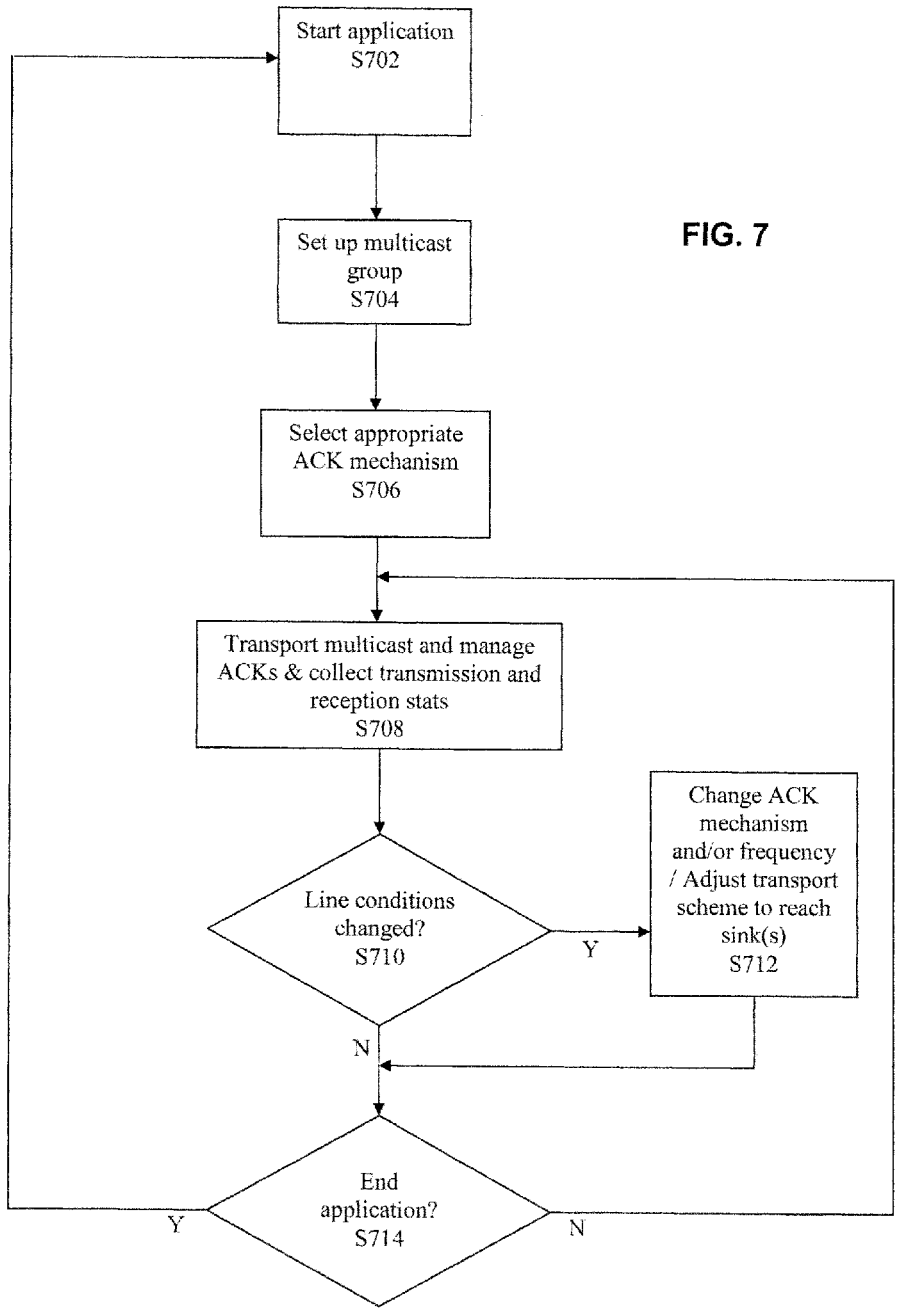
FIG. 7 is a flowchart illustrating an example method for selecting and managing acknowledgement mechanisms for multicast data in a wireless network according to embodiments of the invention.

As shown in FIG. 7, in step S702 an application is started. This can be performed in a WiFi audio/video system such as that shown in FIG. 3 by a user selecting content to be rendered, which consequently initiates a rendering application by source device 304.

Next in step S704, the multicast group is set up. This can be done in accordance with IEEE 802.11aa, as possibly adapted by the present invention. For example, if the source device is a non-AP device, the group setup can be modified as set forth in co-pending application Ser. No. 14/316,222.

Along with the application being started, in step S706 the source device 304 determines the acknowledgement mechanism that is to be used (e.g. one of Mechanism 1, 2 or 3). According to aspects of the invention, the acknowledgement mechanism is selected based on the particular user requirements of the initiated application in step S704. For example, for delay sensitive applications, Mechanism 1 can be used as the acknowledgement mechanism, but for applications that are able to buffer data before playing out Mechanism 3 can be useful.

After the application is started and the appropriate acknowledgement mechanism has been selected by the source device 304, the source device begins transmitting multicast data and managing acknowledgements for the application using the selected mechanism as shown in step S708. This can be done largely in accordance with IEEE 802.11aa as adapted by the present invention as described in more detail above, as well as in the co-pending application.

However, the present inventors recognize that current IEEE standards allow only a single way to setup the Block Acknowledgement (i.e. Block ACK) mechanisms. Accordingly, embodiments of the invention supplement the current standards to help realize the use of the different mechanisms more effectively.

First, given that there are multiple sinks acknowledging after each data packet transfer, embodiments of the invention signal in the Block ACK setup, example "Sequence Number" (i.e. a predefined order of the sinks) after which the Sink is supposed to transmit the Block ACK (i.e., there is no need for Block ACK request). Note that even if there is a sink that did not receive the packet, i.e., the medium is occupied by a "non-sink" device, a sink that is supposed to send the Block ACK (e.g. based on the time since last Block ACK was sent has elapsed is nsink*Tarr) can contend for the medium and send the Block ACK to the source device. This allows Block ACK to be sent even without the source device sending a Block ACK request.

In these and other embodiments, in the data transmitted to the multicast group, the source device includes a field in the multicast data to signal which of the sink(s) are expected to send a Block ACK after the end of the current data transmission. The sink(s) can be identified by a Bit Map where each bit corresponds to a sink, for example a sink number assigned to the sink as negotiated during GCR and Block ACK setup. Or, the sink(s) can be identified explicitly by transmitting the MAC address of the sink(s) that are required to send a Block ACK after the end of the reception of the current data.

Additionally or alternatively, in the data transmitted, the source device in embodiments of the invention include a "bit" to signal that all the sinks are required to send a Block ACK at the end of the current data reception. In other words, they go through regular contention to get the medium and send the Block ACK to the source.

As optionally shown in FIG. 7, additional or alternative embodiments of the invention include the source device monitoring line conditions in step S708 and making necessary adjustments if needed as determined in step S710. In embodiments, the adjustments in step S712 can be performed in accordance with an algorithm to vary the frequency of the acknowledgements to sinks that are experiencing bad link conditions, vary the application packet size, and/or if the number of sink devices that are receiving the content and are experiencing bad link conditions are beyond a certain threshold, remove sink devices from the multicast group and reach them instead via unicast transmission or via an Access Point.

The following parameters that are either derived or monitored by the source device are used in describing the algorithm:

p_lr_th1: Threshold of packet loss rate of a sink to mark the sink as a Bad_SINK (typical value around 10%).

p_lr_th2: Threshold of packet loss rate of a sink to reach the sink via unicast. This parameter can be fixed set based upon p_lr that would result in MSDU transfer delay TX_Delay_Th becoming a large value (e.g. 200 msec).

Bad_SINK: A sink device receiving content via multicast with a packet loss rate>=p_lr_th1.

Good SINK=Number of sinks in the system−number of Bad_SINK devices.

Meas_Window: Measurement period of time (sliding window) during which the packet loss rate of a sink is computed. This is nothing but the number of unique packets that were attempted to be transmitted from the start of the Meas_Window and are not yet successfully transmitted to the sink at the end of Meas_Window period.

U_cast: Denotes that unicast is being used for the device.

WiFi Direct Connectivity: If the sink can be reached via WiFi direct and the sink has a lower packet error rate for transmission over WiFi Direct as compared to multicast transmission (e.g. beam forming, etc).

Connection via AP. This provides support for embodiments in which initial data transmission is from the source to the AP and then the data is transmitted by the AP to the sinks (i.e. relay the data via AP).

Bad_SINK_Th: Threshold of the number of Bad SINKS in the system, after which the system drops the sinks from multicast transmission. Note that even if there is just one "Bad Sink" in the system, the MSDU transfer delay can be high. This situation is addressed by deleting "Bad Sinks" in the system based on p_lr_th2.

MAX Block_ACK_frequency: Block ACK Frequency when using the minimum MSDU Size for a maximum App_Rate.

MSDU_Th_max: Maximum Size of the MSDU (maximum packet size).

MSDU_Th_min: Minimum Size of MSDU (minimum packet size)

The algorithm can be generally performed as follows. After a specific predefined observation period during which the packet loss rate at the sink is monitored, the source device does the following. If the computed packet loss rate is between the thresholds p_lr_th1 and p_lr_th2 then: (1) the source device increases the frequency at which the Block ACK is requested by a factor of two; (2) if the Block ACK frequency is already at the maximum value, then change the application packet size (i.e. the size of MSDU) to a smaller value; and (2) if the application packet size is already at a minimum value, increase the application rate (i.e., perform application level encoding to increase robustness). If the computed packet loss rate is beyond a threshold (p_lr_th2), there is no point reaching the sink via multicast. It is better to perform unicast, either by performing beamforming or transporting the data via AP.

If the source device determines that the number of sink devices that are experiencing bad link conditions is beyond a threshold (BAD_SINK_Th) then it is better to remove some sinks from the multicast list.

Pseudocode for an example implementation of the above-described algorithm is provided below.

```
Start of Procedure

If(Good_SINK > 2* Bad_SINK and Bad_SINK < Bad_SINK_Th)
    For (All Bad_SINKs)
        If(p_lr(sink_i) < p_lr_th2)
            Block_ACK_frequency(sink_i) = 2*Block_ACK_frequency(sink_i)
            {maximum value of Block_ACK_frequency is not more than a Block ACK in Tarr
        period)
            If(Block_ACK_frequency(sink_i) >= MAX Block_ACK Frequency)
            Reduce(MSDU Size)
                (A smaller MSDU Size lowers Tarr for the same App_Rate and increases
                Block ACK frequency)
                    If(MSDU Size <= MSDU_Th_min) increase (App_Rate);
        Else (i.e., the sink has p_lr(sink_i) >= p_lr_th2)
            Reach the Sink via U_cast (this sink is no longer counted in Bad_SINK and
Bad_SINK_Th)
Else (Number of Bad Sinks is higher than 50% of Good Sinks)
    If (Good_SINK <= 2* Bad_SINK and Bad_SINK < Bad_SINK_Th)
        Sort the Sinks in decreasing order of their Packet Loss Rate and for the top
        (Bad_SINK − (Good_SINK/2)) number of sinks, transport data via Unicast
```

```
                    Start of Procedure

Else (Number of Bad Sinks is more than Bad_SINK_Th)
     Sort the Sinks in decreasing order of their Packet Loss Rate and reach the top
          (Bad_SINK – Bad_SINK_Th) via Unicast
Go to Start of Procedure
```

Aspects of the algorithm according to embodiments of the invention also include recovery procedures for improving network conditions, as shown in the example pseudocode below.

```
Procedures to ramp up on the MSDU Size, Lower Block ACK Frequency,
              Re-instate Sinks to Multicast Group If all sinks in Multicast Group have Packet Loss Rate (p_lr) <
p_lr_th1
              Increase MSDU Size (no more than MSDU_Th_max)
// This will increase Medium Efficiency
              If (MSDU Size >= MSDU_Th_max) Lower
              Block ACK Frequency
                    Minimum Block ACK Frequency is no lower
              than one Block ACK every "nsink"number of Packets
                    If(Block_ACK_frequency(sink_i) <=
              Minimum Block ACK Frequency) Lower App_Rate;
         Re-instating Sinks to Multicast Groups:
                    if(p_lr(sink_i) < p_lr_th1) Reinstate Sink
                         to the Multicast Group
                         (Alternately)
                    if(p_lr_th1 < p_lr(sink_i) <
(p_lr_th1 + p_lr_th2)/2) Re-instate Sink to the Multicast Group
```

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for transmitting multicast/groupcast (MG) data to a group of devices in a wireless network, the method comprising:
   determining one or more communication requirements for the group of devices;
   selecting one of a plurality of MG acknowledgement mechanisms based at least in part on the one or more communication requirements;
   transmitting MG data to the group of devices; and
   requesting acknowledgement of the MG data, by each device in the group, in accordance with the selected MG acknowledgement mechanism, wherein each of the plurality of MG acknowledgement mechanisms defines a respective timing relationship between the transmissions of MG data and acknowledgements of the transmitted data with respect to each device in the group.

2. The method of claim 1, wherein the one or more communication requirements includes at least one of a throughput, latency, or delay requirement.

3. The method of claim 1, wherein the requesting comprises:
   communicating information regarding the selected MG acknowledgement mechanism to the group of devices.

4. The method of claim 1, further comprising:
   detecting a change in one or more conditions of the wireless network; and
   selecting a new MG acknowledgement mechanism based on the detected change.

5. The method of claim 1, wherein the method is performed by a source device other than an access point (AP) for the wireless network.

6. The method of claim 1, wherein the MG data is transmitted in accordance with IEEE 802.11aa protocols.

7. The method of claim 1, wherein the MG data comprises one or more media access control protocol data units (MPDUs) with media access control service data unit (MSDU) frames or aggregated MSDU (A-MSDU) frames.

8. The method of claim 1, wherein the requesting comprises:
   transmitting block acknowledgement (ACK) request frames to each device in the group according to a schedule associated with the selected MG acknowledgement mechanism.

9. The method of claim 1, wherein the MG data is in accordance with the User Datagram Protocol (UDP).

10. The method of claim 1, further comprising:
    receiving acknowledgements from the group of devices according to a schedule associated with the selected MG acknowledgement mechanism; and
    selectively retransmitting one or more data frames of the MG data based on the acknowledgements.

11. The method of claim 1, wherein the MG data is transmitted to the group of devices in accordance with the selected MG acknowledgement mechanism.

12. The method of claim 1, wherein each of the plurality of MG acknowledgement mechanisms defines a respective timing relationship between the transmissions of MG data and retransmissions of the transmitted data with respect to each device in the group.

13. The method of claim 1, further comprising:
    monitoring link conditions among the group of devices; and
    adjusting a frequency of acknowledgements by one or more devices in the group in response to changes in the link conditions.

14. The method of claim 1, further comprising:
    monitoring link conditions among the group of devices; and
    adjusting an application packet size of the MG data in response to changes in the link conditions.

15. The method of claim 1, further comprising:
    monitoring link conditions among the group of devices; and
    adjusting the transmissions of MG data, to one or more devices in the group, from multicast transmissions to unicast transmissions in response to changes in the link conditions.

16. The method of claim 1, further comprising:
    monitoring link conditions among the group of devices; and
    routing the transmissions of MG data, to one or more devices in the group, through an AP in response to changes in the link conditions.

17. The method of claim 16, further comprising:
transmitting the MG data directly to the one or more devices in response to further changes in the link conditions.

18. A wireless device comprising:
one or more processors; and
a memory storing instructions that, when executed by the one or more processors, cause the wireless device to:
- determine one or more communication requirements for a group of devices;
- select one of a plurality of MG acknowledgement mechanisms based at least in part on the one or more communication requirements;
- transmit MG data to the group of devices; and
- request acknowledgement of the MG data, by each device in the group, in accordance with the selected MG acknowledgement mechanism, wherein each of the plurality of MG acknowledgement mechanisms defines a respective timing relationship between the transmissions of MG data and acknowledgements of the transmitted data with respect to each device in the group.

19. The wireless device of claim 18, wherein the one or more communication requirements includes at least one of a throughput, latency, or delay requirement.

20. The wireless device of claim 18, wherein the MG data is transmitted to the group of devices in accordance with the selected MG acknowledgement mechanism, and wherein execution of the instructions further causes the wireless device to:
communicate information regarding the selected MG acknowledgement mechanism to the group of devices.

* * * * *